Dec. 13, 1960 T. R. STRAWN 2,964,271
AMPHIBIAN AIRCRAFT
Filed Dec. 17, 1956 2 Sheets-Sheet 1
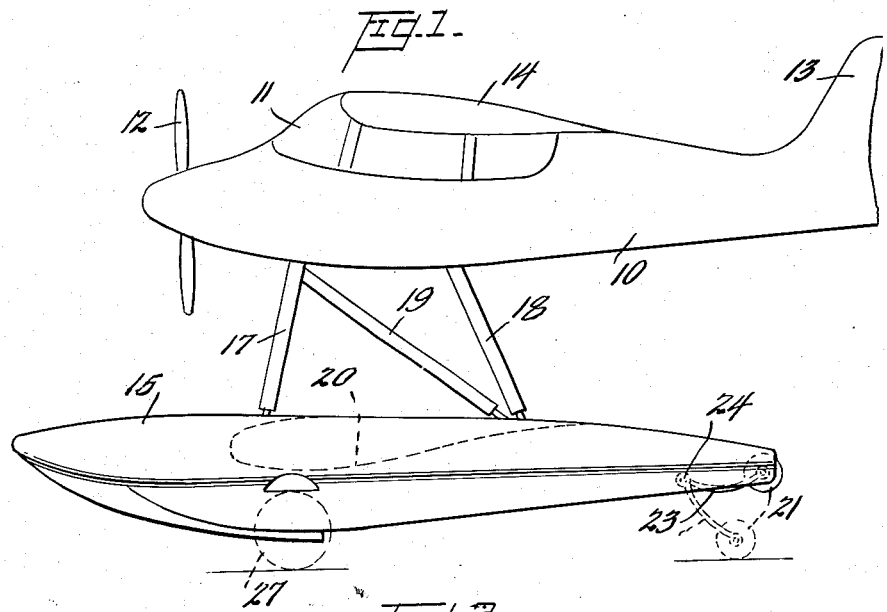
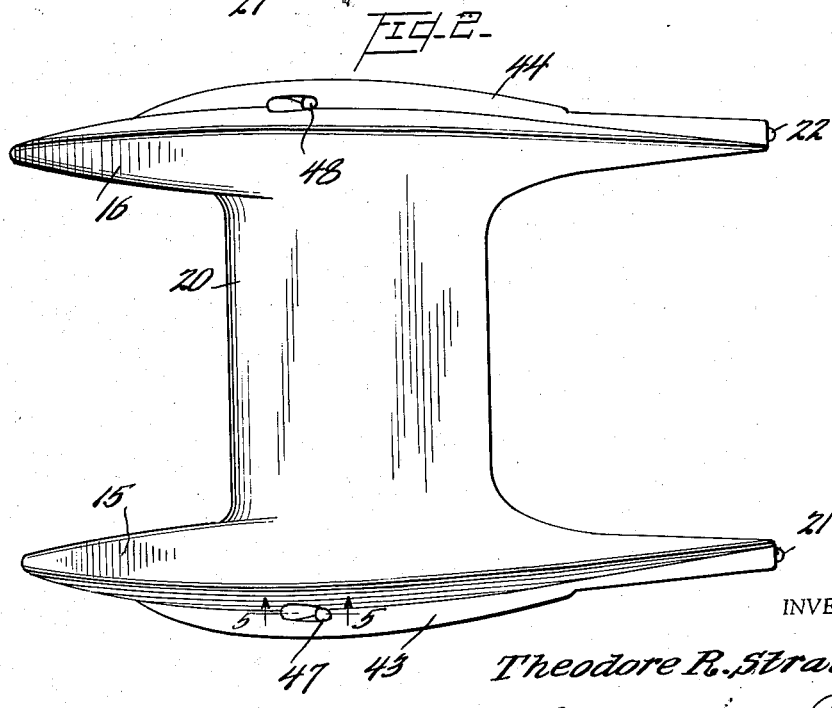
INVENTOR
Theodore R. Strawn,
BY Parker and Walsh
ATTORNEYS Dec. 13, 1960 T. R. STRAWN 2,964,271
AMPHIBIAN AIRCRAFT
Filed Dec. 17, 1956 2 Sheets-Sheet 2
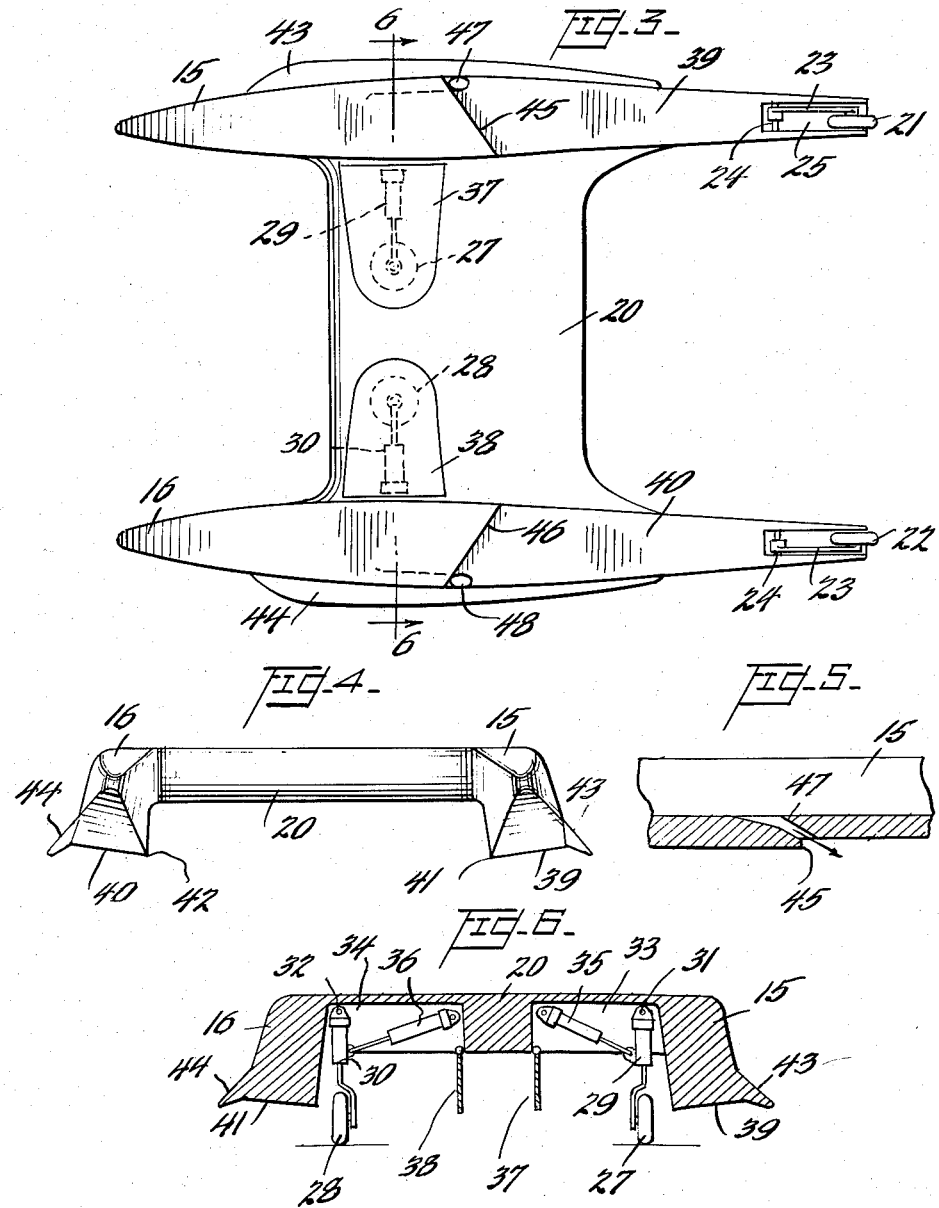
INVENTOR
Theodore R. Strawn,
BY Parker and Walsh
ATTORNEYS

United States Patent Office 2,964,271
Patented Dec. 13, 1960

2,964,271

AMPHIBIAN AIRCRAFT

Theodore R. Strawn, 910 North Blvd., De Land, Fla.

Filed Dec. 17, 1956, Ser. No. 628,801

8 Claims. (Cl. 244—101)

The present invention relates generally to the field of aeronautics and is more particularly directed to certain new and useful improvements in amphibian aircraft capable of taking off and landing upon either a solid ground or water surface.

As is well known to those skilled in the art, every successful airplane design represents a compromise wherein the aeronautical engineer or designer must of necessity sacrifice in part certain desirable characteristics in order to achieve other characteristics essential to an efficient, workable product. Thus, the wing shape and size must be such as to provide relatively high cruising speed consistent with the ability to operate at reasonably low speed during takeoff and landing. In like manner, the power plant must be selected to provide adequate thrust for high speed operation and yet, at the same time, must not be so heavy as to produce an unusually steep power off gliding angle. Similar considerations must be taken into account with respect to the empennage, propeller, and, in fact, the size, weight and shape of every element employed.

While design compromises of the type referred to above are to be found in every aircraft, the problem becomes most critical in the case of amphibian aircraft which must operate satisfactorily from either land or water. In a sense, every amphibian aircraft is penalized at the very start by the inherent requirements of its design since it must carry some sort of wheel type landing gear for operation from the ground as in the case of a conventional airplane and, in addition, must include some sort of float structure for operating from the water as in the case of a seaplane. As a result, the amphibian aircraft must be able to carry the double weight of both types of landing gear and, furthermore, is equally subject to the undesirable aerodynamic drag of such gears.

From another standpoint, it is equally well known to those skilled in the art that the hydrodynamic flow conditions desirable for efficient operation of a float on the water dictate a design producing relatively undesirable aerodynamic flow conditions when airborne. Again, therefore, the amphibian designer is faced with a difficult compromise since the amphibian aircraft must operate successfully both on the water and in the air and the float design criteria for each condition differ substantially. In the case of the so-called floatplane of the amphibian type, and especially where the aircraft is within the well recognized lightplane category, all of these various compromises become perhaps most critical of all and are even further complicated by the aerodynamic drag of the necessarily heavy struts which serve to interconnect the floats and the main body or fuselage of the aircraft.

In the light of the foregoing, it is a principal object of the present invention to provide an amphibian aircraft of the type described having a novel amphibian landing gear resulting in improved operating conditions on both land and water.

Another object of the invention is to provide an amphibian aircraft of the type described having a secondary lift producing airfoil or stub wing extending between the floats in place of the usual drag producing float spacers.

A further object of the invention is to provide an amphibian aircraft of the type described in which the main ground landing gear retracts substantially completely within a stub wing extending between the floats thereby preserving the water tight integrity and both the aerodynamic and hydrodynamic characteristics of the floats as well as providing a more rugged gear than that generally attainable where the main wheels retract within the floats.

An additional object of the invention is to provide an amphibian aircraft of the type described having a float structure possessing novel features and affording, in and of itself, improved hydrodynamic and aerodynamic characteristics.

The foregoing, together with other and further objects and advantages of the present invention, will become more readily apparent to one skilled in the art from a consideration of the following detailed specification taken in conjunction with the accompanying figures of drawing in which:

Figure 1 is a somewhat schematic side elevational view of one form of improved amphibian aircraft in accordance with the present invention, certain portions being broken away and others largely omitted for the sake of clarity;

Figure 2 is a top plan view of the novel floats and interconnecting stub wing shown in Figure 1, the usual strut fittings and other hardware being omitted for the sake of clarity;

Figure 3 is a bottom plan view of the floats and interconnecting stub wing of Figure 2, showing the ground landing gear in retracted position;

Figure 4 is a front elevational view of the floats and interconnecting stub wing of Figures 2 and 3;

Figure 5 is a fragmentary, detailed, cross-sectional view through a portion of one of the floats taken substantially along the line 5—5 of Figure 2; and Figure 6 is a transverse cross-sectional view taken substantially along the line 6—6 in Figure 3 but illustrating the main ground landing gear in extended position.

Referring now in somewhat greater detail to the various figures of the drawings and in particular to Figure 1, thereof, a preferred embodiment of amphibian aircraft in accordance with the present invention is illustrated somewhat schematically in the form of what is commonly known as a floatplane and, as will be apparent to those skilled in the art, the aircraft of Figure 1 is also easily identifiable as being in the lightplane category. As shown in this view, the aircraft comprises a fuselage 10 having the usual pilot and/or passenger compartment 11, propeller 12 and empennage shown fragmentarily at 13. A primary lift producing airfoil or main wing 14 is attached in any convenient manner as by use of the usual wing root fittings (not shown) to the upper, forward portion of the fuselage 10. Although they have not been illustrated in detail in the drawings, it is to be understood that the aircraft of Figure 1 is also provided with a suitable power plant connected in driving relationship to the propeller 12 as well as the usual control surfaces including horizontal and vertical stabilizers, elevators, rudder, ailerons, and other refinements such as flaps and trim tabs if desired.

Still referring to Figure 1 and also to Figures 2 and 3, it will be noted that the lower forward portion of the fuselage 10 is mounted on and securely connected to a pair of floats 15—16 in any convenient manner as by means of a plurality of relatively rigid struts 17—18 and suitable diagonal braces 19. The floats 15—16 are of hollow, buoyant construction and serve to support the entire weight of the aircraft when the latter is water borne in the usual manner by displacing a volume of water equal in weight to the total weight of the aircraft. It will be particularly noted that the floats 15—16 are interconnected by means of a secondary lift producing airfoil or stub wing 20 which is attached to and extends between the floats so as to space the latter transversely of the aircraft. The airfoil shape or contour of the stub wing 20 may be observed from the dotted line showing of Figure 1.

Referring now particularly to Figures 1, 3 and 6, there is illustrated the improved ground landing gear in accordance with the present invention. This landing gear comprises a pair of steerable, retractable tailwheels 21—22 mounted one at the rear end of each of the floats 15—16 and preferably provided with supporting arms such as indicated at 23 in Figure 1, pivoted as at 24 in such manner that both tailwheels 21—22 may be retracted by any suitable mechanism up and into a pair of tailwheel wells 25—26 as illustrated in Figure 3. As shown in Figure 1 and also in Figure 3, the tailwheels 21—22 retract substantially fully within the wells 25—26 leaving only a small portion of the wheel, approximately the thickness of the wheel tire, extending rearwardly and below each float when the tailwheels are in retracted position.

In addition to the tailwheels 21—22, the aircraft undercarriage is provided with a main landing gear including a pair of wheels 27—28, rotatably mounted in any convenient manner at the outer ends of the usual supporting shock struts 29—30. It is to be understood that the specific details of the shock struts 29—30 and the main gear retracting mechanism per se form no part of the present invention since a variety of suitable retractable gears of this type are on the market and any of a number of such mechanisms will serve the purposes of the present invention. For the sake of illustration, the shock struts 29—30 are shown as being pivotally mounted as at 31—32 within suitable wells 33—34 formed in the stub wing 20. The wheels 27—28 may be moved between ground contacting position in which they extend below and adjacent to the floats as shown in full lines in Figure 6 and retracted position in which they lie substantially wholly within the airfoil contour of the stub wing 20 as shown in Figure 3 by means of hydraulic actuating mechanisms shown schematically in Figure 6 and designated by reference numerals 35 and 36. It is also to be understood that when the main landing gear is retracted, the wells 33—34 formed in the lower surface of the stub wing 20 may be closed in any convenient manner so as to maintain the smooth airfoil shape of the stub wing 20 and, at the same time, to protect the main landing gear from spray when the aircraft is water borne. Again, the specific details of the closure device are susceptible of wide variation but for the sake of illustration I have shown wheel well closures in the form of flaps 37—38 which are represented entirely schematically.

From the description thus far it will be apparent that the amphibian aircraft, in accordance with the present invention, is capable of operation from either a land or water surface. When the aircraft is to be operated from a water surface, the main wheels 27—28 and the tailwheels 21—22 are retracted to the positions as indicated in Figure 3 and in full lines in Figure 1. When the aircraft is to be operated from a land surface the tailwheels and main wheels are extended to the dotted line positions as shown in Figure 1, the main wheels 27—28 occupying the positions illustrated in Figure 6. While I have not illustrated the specific control instrumentalities such as the pumps, valves, pressure lines and fittings necessary to hydraulic actuation of the gear retracting mechanism or the lines and cables used in mechanical systems for accomplishing the same result, it is believed that such control elements are sufficiently well known to those skilled in the art that they need not be described in detail herein.

As indicated hereinabove in the general statement of objects and advantages of the invention, one of the important aims of the present invention is to provide a float structure of novel shape and configuration affording improved hydrodynamic and aerodynamic characteristics over those heretofore known in th art. To this end, it will be noted that each of the floats 15—16 is provided with a generally flat bottom surface as seen in any transverse section, the surfaces being designated in Figure 4 by reference characters 39—40, respectively. It will also be noted, particularly in Figure 4, that the flat transverse bottom surfaces 39—40 of the floats 15 and 16 are inclined upwardly and outwardly relative to the longitudinal axis of the aircraft so that the inner edges 41—42 of the floats may act somewhat in the manner of the usual float keel but without the additional drag produced by the latter. Along their bottom outer edges, the floats 15 and 16 are provided throughout a portion of their length with generally outwardly and downwardly extending, longitudinally tapering sponsons 43—44. The sponsons 43—44 serve both to improve the planing characteristics of the floats and also to materially reduce the water spray which is usually produced during taxiing.

In accordance with the present invention, each of the floats 15—16 is also provided in the bottom surface 39—40 thereof with a step 45—46 and, as will be apparent in Figure 3, the steps 45—46 are rearwardly and inwardly slanted in a generally transverse direction relative to the longitudinal axis of the aircraft. It will also be noted, particularly in Figures 2, 3 and 5, that each of the floats 15—16 is provided with an air conducting passageway designated by reference numerals 47—48. These air conducting passageways extend from points above the sponsons 43—44 in a generally downward and rearward direction near the central portion of each float and terminate at points beneath and inwardly of the sponsons just rearwardly of the outer edge portions of the steps 45—46 closely adjacent to the latter. As will be apparent to those skilled in the art, the air conducting passageways 47—48 which open in a generally forward direction at the top, serve to conduct air from above the sponsons downwardly and to discharge the same just behind the float steps in such manner as to tend to break the vacuum holding the floats upon the water so that they may rise onto the steps and plane thereby reducing friction and permitting the aircraft to attain sufficient forward velocity for take-off.

Although not hereinabove specifically pointed out from the standpoint of structure, it will be apparent to those skilled in the art that by arranging the stub wing 20 between the floats 15—16 in the manner shown, the floats will themselves act as end plates so as to reduce any tendency to the creation of tip vortices at the ends of the stub wing. The stub wing 20, in other words, is thus given improved aerodynamic properties by reason of its location and without the necessity of providing additional end plates which would serve no other useful purpose and would merely increase the overall weight of the aircraft. This additional function of the floats in serving as end plates for the stub wing 20 is deemed to be of particular importance in the present instance in view of the fact that the stub wing 20 is not tapered as is the usual airfoil so that the tendency to form wing tip vortices would otherwise be even more pronounced than in the case of a conventional tapered airfoil.

In actual practice, the novel construction hereinabove described has been observed to produce substantial aerodynamic and hydrodynamic improvements. Aircraft constructed in accordance with the principles of the present invention are capable of greater top and cruising speed and show exceptional stability both under stall conditions and during climb both at maximum rates and at rates approaching the stalling point. The stub wing 20, by reason of its location closely adjacent the surface of the land or water during landing and take-off, exhibits a pronounced "ground cushion" effect and thus produces exceptional handling characteristics during critical periods of operation. The construction likewise exhibits superior water handling characteristics in addition to virtually eliminating the usual damaging water spray and shows improved take-off and landing characteristics both under smooth as well as rough water conditions. Although difficult to analyze, it is also apparent that there is some sort of interplane relationship between the upper surface of the stub wing 20 and the bottom surface of the fuselage 10 as a result of which the slip stream produced by the propeller 12 achieves a pronounced lifting effect as it flows between the fuselage and the stub wing.

While there is shown and described herein a preferred embodiment of the present invention, it is to be understood that such embodiment has been selected solely for the purpose of illustration and that numerous modifications, alterations and deviations from the specific forms shown will occur to those skilled in the art without departing from the spirit or scope of the invention as defined in the appended claims.

I claim:

1. An amphibian aircraft comprising a fuselage, a main wing attached to the upper, forward portion of said fuselage, a pair of floats for supporting said aircraft upon a water surface, a plurality of struts securely interconnecting said floats and the lower forward portion of said fuselage, a stub wing attached to and extending between said floats and serving to space the latter transversely of said aircraft, a pair of steerable, retractable tailwheels mounted one at the rear end of each of said floats, and a main landing gear including a pair of wheels and supporting shock struts pivotally mounted adjacent the inner faces of said floats for movement between ground contacting position extending below and adjacent to said floats and retracted position lying substantially wholly within the airfoil contour of said stub wing, each of said floats having a generally flat transverse bottom surface inclined upwardly and outwardly relative to the longitudinal axis of said aircraft, a generally outwardly and downwardly extending, longitudinally tapering sponson along each bottom outer edge, a rearwardly and inwardly slanted transverse bottom step, and an air conducting passageway extending from the central portion of each float above its associated sponson downwardly and rearwardly and terminating at a point beneath and inwardly of said sponson adjacent and rearwardly of the outer edge portion of its associated step.

2. An amphibian aircraft comprising a fuselage, a main wing attached to the upper, forward portion of said fuselage, a pair of floats for supporting said aircraft upon a water surface, a plurality of struts securely interconnecting said floats and the lower forward portion of said fuselage, a stub wing attached to and extending between said floats and serving to space the latter transversely of said aircraft, a pair of steerable, retractable tailwheels mounted one at the rear end of each of said floats, and a main landing gear including a pair of wheels and supporting shock struts pivotally mounted adjacent the inner faces of said floats for movement between ground contacting position extending below and adjacent to said floats and retracted position lying substantially wholly within the airfoil contour of said stub wing, each of said floats having a generally flat transverse bottom surface inclined upwardly and outwardly relative to the longitudinal axis of said aircraft, a generally outwardly and downwardly extending, longitudinally tapering sponson along each bottom outer edge, and a rearwardly and inwardly slanted transverse bottom step.

3. An amphibian aircraft comprising a fuselage, a main wing attached to the upper, forward portion of said fuselage, a pair of floats for supporting said aircraft upon a water surface, a plurality of struts securely interconnecting said floats and the lower forward portion of said fuselage, a stub wing attached to and extending between said floats and serving to space the latter transversely of said aircraft, a pair of steerable, retractable tailwheels mounted one at the rear end of each of said floats, and a main landing gear including a pair of wheel and supporting shock struts pivotally mounted adjacent the inner faces of said floats for movement between ground contacting position extending below and adjacent to said floats and retracted position lying substantially wholly within the airfoil contour of said stub wing, each of said floats having a generally flat transverse bottom surface inclined upwardly and outwardly relative to the longitudinal axis of said aircraft, and a generally outwardly and downwardly extending, longitudinally tapering sponson along each bottom outer edge.

4. An amphibian aircraft comprising a fuselage, a main wing attached to the upper, forward portion of said fuselage, a pair of floats for supporting said aircraft upon a water surface, a plurality of struts securely interconnecting said floats and the lower forward portion of said fuselage, a stub wing attached to and extending between said floats and serving to space the latter transversely of said aircraft, a pair of steerable, retractable tailwheels mounted one at the rear end of each of said floats, and a main landing gear including a pair of wheels and supporting shock struts pivotally mounted adjacent the inner faces of said floats for movement between ground contacting position extending below and adjacent to said floats and retracted position lying substantially wholly within the airfoil contour of said stub wing, each of said floats having a generally flat transverse bottom surface inclined upwardly and outwardly relative to the longitudinal axis of said aircraft.

5. An amphibian aircraft comprising a fuselage, a primary lift producing airfoil attached to said fuselage, a pair of floats for supporting said aircraft upon a water surface, means interconnecting said floats and said fuselage, a secondary lift producing airfoil attached to and extending between said floats and serving to space the latter transversely of said aircraft, a pair of tailwheels mounted one at the rear end of each of said floats, and a main landing gear including a pair of wheels and supporting shock struts pivotally mounted adjacent the inner faces of said floats for movement between ground contacting position extending below and adjacent to said floats and retracted position lying substantially wholly within the airfoil contour of said secondary airfoil, each of said floats having a generally flat transverse bottom surface inclined upwardly and outwardly relative to the longitudinal axis of said aircraft.

6. An amphibian aircraft comprising a fuselage, a primary lift producing airfoil attached to said fuselage, a pair of floats for supporting said aircraft upon a water surface, means interconnecting said floats and said fuselage, a secondary lift producing airfoil attached to and extending between said floats and serving to space the latter transversely of said aircraft, and a main landing gear including a pair of wheels mounted for movement between ground contacting position extending below and adjacent to said floats and retracted position lying substantially within the airfoil contour of said secondary airfoil, each of said floats having a generally flat transverse bottom surface inclined upwardly and outwardly relative to the longitudinal axis of said aircraft.

7. In an amphibian aircraft comprising a primary lift producing airfoil and a pair of floats for supporting said aircraft upon a water surface, a secondary lift producing airfoil attached to and extending between said floats and serving to space the latter transversely of said aircraft, and a main landing gear including a pair of wheels mounted for movement between ground contacting position extending below and adjacent to said floats and retracted position lying substantially within the airfoil contour of said secondary airfoil, each of said floats having a generally flat transverse bottom surface inclined upwardly and outwardly relative to the longitudinal axis of said aircraft.

8. An amphibian aircraft comprising a fuselage, a primary lift producing airfoil attached to said fuselage, a pair of floats for supporting said aircraft upon a water surface, a plurality of struts interconnecting said floats and said fuselage, a secondary lift producing airfoil attached to and extending between said floats and serving to space the latter transversely of said aircraft, and a main landing gear including a pair of wheels mounted for movement between ground contacting position extending below and adjacent to said floats and retracted position lying substantially within the airfoil contour of said secondary airfoil, each of said floats having a generally flat transverse bottom surface inclined upwardly and outwardly relative to the longitudinal axis of said aircraft and a generally flat inner wall inclined inwardly and upwardly relative to the longitudinal axis of said aircraft, each of said inner walls being substantially parallel to the longitudinal axes of its associated struts and securely fastened thereto.

References Cited in the file of this patent

UNITED STATES PATENTS

| | | |
|---|---|---|
| 1,512,912 | Driggs | Oct. 28, 1924 |
| 1,639,796 | Congdon | Aug. 23, 1927 |
| 1,748,252 | Sunstedt | Feb. 25, 1930 |
| 1,812,265 | Hone | June 30, 1931 |
| 1,930,922 | Burnelli | Oct. 17, 1933 |
| 2,391,326 | McKinley | Dec. 18, 1945 |